United States Patent [19]

Bokerman et al.

[11] Patent Number: 5,075,479

[45] Date of Patent: Dec. 24, 1991

[54] ANHYDROUS HYDROGEN CHLORIDE EVOLVING ONE-STEP PROCESS FOR PRODUCING SILOXANES

[75] Inventors: Gary N. Bokerman, Madison, Ind.; Steven K. Freeburne, Edgewood, Ky.; Lawrence M. Schuelke; Dennis G. VanKoevering, both of Midland, Mich.

[73] Assignee: Dow Corning Corporation, Midland, Mich.

[21] Appl. No.: 702,555

[22] Filed: May 20, 1991

[51] Int. Cl.$^5$ ............................................. C07F 7/08
[52] U.S. Cl. .................................. 556/453; 556/452; 556/456
[58] Field of Search ..................... 556/452, 453, 456

[56] References Cited

U.S. PATENT DOCUMENTS

| | | | |
|---|---|---|---|
| 2,483,963 | 10/1949 | Barry et al. | 556/453 X |
| 2,486,162 | 10/1949 | Hyde | 556/453 X |
| 2,491,843 | 12/1949 | Wilcock | 260/448.2 |
| 2,758,124 | 4/1952 | Schwenker | 260/448.2 |
| 2,779,776 | 4/1954 | Hyde | 260/448.2 |
| 3,489,782 | 1/1970 | Pruvost et al. | 556/453 X |
| 3,523,131 | 8/1970 | Sliwinski | 556/453 |
| 3,595,896 | 7/1971 | Nitzsche et al. | 556/453 X |
| 4,515,976 | 5/1985 | Preiver et al. | 556/453 |
| 4,609,751 | 9/1986 | Hajjar | 556/456 |

*Primary Examiner*—Paul F. Shaver
*Attorney, Agent, or Firm*—William F. Boley

[57] ABSTRACT

The instant invention is a one-step process for producing polydiorganosiloxanes (siloxanes). In the described process, a mixture comprising diorganodichlorosilane and a source of triorganosilyl groups is contacted with excess water essentially saturated with hydrogen chloride. Product siloxanes are isolated as well as saturated aqueous hydrogen chloride and anhydrous hydrogen chloride. The amount of triorganosilyl groups present in the mixture is controlled to set the degree of polymerization of product siloxanes. The isolated saturated aqueous hydrogen chloride is recycled to the process. Excess chloride generated in the process is collected as anhydrous hydrogen chloride.

25 Claims, No Drawings

ANHYDROUS HYDROGEN CHLORIDE EVOLVING ONE-STEP PROCESS FOR PRODUCING SILOXANES

BACKGROUND OF INVENTION

The instant invention is a one-step process for producing polydiorganosiloxanes (siloxanes). In the described process, a mixture comprising diorganodichlorosilane and a source of triorganosilyl groups is contacted with excess water essentially saturated with hydrogen chloride. Product siloxanes are isolated as well as saturated aqueous hydrogen chloride and anhydrous hydrogen chloride. The amount of triorganosilyl groups present in the mixture is controlled to set the degree of polymerization of product siloxanes. The isolated saturated aqueous hydrogen chloride is recycled to the process. Excess chloride generated in the process is collected as anhydrous hydrogen chloride.

Current production of polydiorganosiloxane polymers, for example, polydimethylsiloxane, is a multi-step process. In a typical process, a first step involves hydrolyzing dimethyldichlorosilane in excess water. The hydrolysate rapidly undergoes condensation to form an equilibrium mixture of low molecular weight permethylcyclosiloxanes and low molecular weight dimethylsiloxane linears, with end-terminal hydroxy substitution. A by-product of this reaction is an aqueous hydrogen chloride solution.

In a second step, the low molecular weight condensation products are then further polymerized and end blocked in an acid or base catalyzed process to create high molecular weight polydimethylsiloxane fluids.

The aqueous hydrogen chloride produced in the first hydrolysis step presents a problem of acid disposal or recovery. Both the expense of disposing of the environmentally hazardous aqueous hydrogen chloride solution and the inherent value of chloride makes recovery a preferred option. One procedure for recovering anhydrous hydrogen chloride from the aqueous hydrogen chloride is to distill the solution to produce a constant boiling hydrogen chloride-water azeotrope along with anhydrous hydrogen chloride. A significant amount of energy is required in this process. Therefore, one objective of the instant process is to provide a method for efficient recovery of hydrogen chloride. This objective is achieved by running the present process utilizing a saturated aqueous hydrogen chloride solution, thereby causing additional hydrogen chloride liberated during the hydrolysis reaction to evolve as anhydrous hydrogen chloride gas. This negates the need for a distillation step to recover hydrogen chloride generated by the process.

Hyde et al. U.S. Pat. No. 2,779,776 teaches that the reaction between a siloxane and an aqueous acid is reversible and that the degree of polymerization of the siloxane at the point of equilibrium of the reversible reaction is determined by the concentration of the acid in the aqueous phase. Since the instant process is run under conditions of essentially saturated acid, to allow flexibility of the process, an alternative method of controlling polymer length is desirable. Therefore, a second objective of the instant invention is to provide a process whereby the degree of polymerization is independent of acid concentration.

Hansen, et al., Co-Pending U.S. Pat. application Ser. No. 07/612,655, teaches that in the acid catalyzed condensation of polydiorganosiloxanes containing end-terminal hydroxy functionality, control of polymer length can be effected by the presence of a source of triorganosilyl groups. This process is taught to be much faster than the equilibrium process, as exemplified by Hyde, supra, and therefore the principle determinate of polymer length.

Wilcock, U.S. Pat. No. 2,491,843, teaches a method of contacting an aqueous concentrated hydrochloric acid solution and a mixture of trimethylchlorosilane and methyldichlorosilane to form a plurality of linear polymethylhydrogensiloxanes end blocked with trimethylsilyl groups. Wilcock does not appear to have recognized the importance of controlling the level of trimethylchlorosilane to dictate polymer chain length and makes no provision for assuring evolution of gaseous hydrogen chloride.

Schwenker, U.S. Pat. No. 2,758,124, teaches a continuous process for preparing polyorganosiloxanes. The process comprises: (1) simultaneously passing a mixture of an organochlorosilane and water which may contain up to about 32 percent, by weight hydrogen chloride (based on the total weight of water and hydrogen chloride) into a circulating system: (2) continuing the introduction of acid-free or acid-containing water and organochlorosilane until partial overflow of the formed polyorganosiloxane and acid-containing water of greater hydrogen chloride concentration (than the original feed comprised) is effected: (3) removing said overflow materials and separating the formed polyorganosiloxane from the acid-containing water, while at the same time recycling the remaining high-acid content water and residual polyorganosiloxane separated from the overflow, so as to diffuse the same into the incoming feed of water or lower acid-containing water and organochlorosilane. The process is run under conditions to substantially repress evolution of gaseous hydrogen chloride.

Hajjar. U.S. Pat. No. 4,609,751, describes a method for hydrolyzing chlorosilanes, for example. dimethyldichlorosilane, to produce polydimethylsiloxane hydrolyzate and an aqueous solution of hydrogen chloride along with anhydrous hydrogen chloride. Chlorosilane hydrolysis is effected in the presence of a substantially stoichiometric equivalence of water which results in the direct generation of anhydrous hydrogen chloride and a saturated aqueous hydrogen chloride. The saturated aqueous hydrogen chloride can be recycled to the chlorosilane hydrolysis step.

The hydrolysis of chlorosilanes occurs rapidly upon contact with water. Therefore limiting the availability of water, as described by Hajjar, supra, has the undesirable effect of limiting the rate of the hydrolysis reaction and subsequent condensation reaction. Therefore, it is a third objective of the instant invention to provide a process where water is present in stoichiometric excess in relation to chloride present as chlorosilane.

Polydiorganosiloxanes prepared by the method of the instant invention are useful in applications such as those for which polydiorganosiloxanes prepared by standard methods are used. These uses include, for example, lubricants, heat transfer media, damping fluids, coatings for glass and ceramics, release agents, and additives into other chemical formulations.

SUMMARY OF THE INVENTION

The instant invention is a one-step process for producing polydiorganosiloxanes (siloxanes). In the described process, a mixture comprising diorganodichlorosilane and a source of triorganosilyl groups is contacted with excess water essentially saturated with hydrogen chloride. Product siloxanes are isolated as well as a saturated aqueous hydrogen chloride and anhydrous hydrogen chloride. The amount of triorganosilyl groups present in the mixture is controlled to set the degree of polymerization of product siloxanes. The isolated saturated aqueous hydrogen chloride is recycled to the process. Additional chloride generated in the process is collected as anhydrous hydrogen chloride.

DESCRIPTION OF THE INVENTION

The present invention is a one-step process for producing polydiorganosiloxanes (siloxanes). The process is run under conditions which cause reaction liberated chloride to be evolved as anhydrous hydrogen chloride gas. The process comprises:

(A) contacting a mixture comprising a chlorosilane of formula $R_2SiCl_2$, where each R is independently selected from a group consisting of alkyl, alkenyl, aryl, and aralkyl radicals of one to 12 carbon atoms, and a source of triorganosilyl groups of formula $R_3Si-$, where R is as previously described and amount of the triorganosilyl groups is effective to control degree of polymerization of siloxanes within a range of 10 to about 700, with a stoichiometric excess of water in relation to chloride present on the chlorosilane, the water being essentially saturated with hydrogen chloride at a temperature of about 24° C. to 100° C. and a pressure of one to ten atmospheres;

(B) isolating siloxanes of formula $R^1R_2SiO(R_2SiO)_aSiR_2R^1$, where a is a value from 10 to 700, R is as previously described, and each $R^1$ is independently selected from a group consisting of R and chloride; anhydrous hydrogen chloride; and essentially saturated aqueous hydrogen chloride; and (C) recycling the essentially saturated aqueous hydrogen chloride to Step (A).

The present invention is a one-step process for producing siloxanes. By one-step process is meant that, the hydrolysis of diorganodichlorosilanes to low molecular weight linear siloxanes with end-terminal chloride and hydroxy substitution and to perorganocyclosiloxanes and their subsequent acid catalyzed condensation to higher molecular weight siloxanes is effected in one pass through a reactor.

The described process requires contact between two immiscible liquid phases of reactants. One phase comprises the mixture of diorganodichlorosilane, triorganosilyl source, and product polydiorganosiloxanes. The other phase comprises the essentially saturated aqueous hydrogen chloride. The interfacial contact between these two phases must be facilitated by a dispersive means that will provide an adequate dispersion of one of the phases in the other. The dispersive means may be, for example, mechanical stirring, sonification, agitation of the reactor, high pressure injection, or impingement mixing.

The chlorosilane feed for the instant process is of a formula $R_2SiCl_2$, where each R is a hydrocarbon radical independently selected from a group consisting of alkyl, alkenyl, aryl, and aralkyl radicals of one to 12 carbon atoms. The hydrocarbon radical can be, for example, methyl, ethyl, propyl, isopropyl, n-butyl, isobutyl, tert-butyl, sec-butyl, pentyl, hexyl, vinyl, amyl, hexenyl, phenyl, tolyl, benzyl, and beta-phenylethyl. The preferred chlorosilane is dimethyldichlorosilane.

Included as a mixture with the chlorosilane is a controlled amount of a triorganosilyl group of formula $R_3Si-$, where each R can be independently chosen hydrocarbon radicals as described for the chlorosilane. The source of the triorganosilyl group can be, for example, a triorganochlorosilane such as trimethylchlorosilane or 5-hexenyldimethylchlorosilane. The source of the triorganosilyl group can be short-chained trimethylsilyl end blocked polydimethylsiloxanes, for example, hexamethyldisiloxane. The preferred triorganosilyl group is trimethylsilyl. The preferred source of triorganosilyl groups is short-chained trimethylsilyl end blocked polydimethylsiloxane.

The triorganosilyl end blocking rate is considerably faster than the condensation rate of the long polymer chains. Therefore, the process equilibrium and consequently the siloxane chain length can be controlled by the triorganosilyl concentration. A useful concentration of triorganosilyl group is when the molar ratio of diorganodichlorosilane to triorganosilyl is in a range of about five to about 350, A preferred concentration of triorganosilyl group is when the molar ratio of diorganodichlorosilane to triorganosilyl is in a range of about 15 to about 100. The molar ratio at which the diorganodichlorosilane and triorganosilyl are controlled in the mixture will depend upon the desired siloxane chain length.

The one-step process of the instant invention is run with a stoichiometric excess of water, in relation to chloride present on the chlorosilane. Where, for purposes of this process, stoichiometric equivalence is one mole of water per two moles of chloride added to the process as chlorosilane. Therefore, the molar ratio of water to chloride can be a value greater than 0.5, with the upper limit being determined primarily by the capacity of the reaction vessel. The greater the excess of water the faster the reaction, however, excess water increases cyclic formation in the process. Therefore, in practice the molar ratio of water to chloride is dictated by the size of the reaction vessel, desired reaction rate, and acceptable levels of cyclosiloxanes. A useful molar ratio of water to chloride is in a range greater than 0.5 to about 200. A preferred molar ratio of water to chloride is in a range of five to about 100. The most preferred molar ratio of water to chloride is in a range of about 10 to 50.

The water within the reactor is essentially saturated with hydrogen chloride. By "essentially saturated" is meant that under process conditions the water present in the reactor contains a concentration of hydrogen chloride such that additional chloride released as a result of the hydrolysis reaction is evolved from the process as anhydrous hydrogen chloride. Under preferred temperature and pressure conditions water essentially saturated with hydrogen chloride will contain 36 to 38 weight percent hydrogen chloride.

The process is run at a temperature of about 24° C. to 100° C. A preferred temperature is within a range of about 45° C. to 50° C. The pressure within the reactor in which the process is run can be within a range of about one to ten atmospheres, with about one atmosphere being the preferred pressure.

Product siloxanes of formula: $R^1R_2SiO(R_2SiO)_aSiR_2R^1$ are isolated, where R is as previously described for the chlorosilanes. The value a can be an integer from 10 to about 700. Preferred is when a has a value of about 30 to 200. Each $R^1$ is independently selected from a group consisting of R, as previously described, and chloride. The preferred product is when all R is methyl and $R^1$ is methyl or chloride.

Isolation of the product siloxanes can be achieved by standard means for separating gas and liquid phases and for separating multiphase liquids. For example, the anhydrous hydrogen chloride can be removed by means of a port located above the level of the liquid within the reactor and the liquid phase can be removed from the reactor by a port located beneath the liquid level. The removed liquid phase consisting of an aqueous phase saturated with hydrogen chloride and a phase containing product siloxanes and unreacted feed materials, can be separated by standard means for effecting phase separation of oil and water dispersions. For example, the liquid phases can be separated by stripping, gravitational settling, centrifugation, coalescence, or membrane separation. In a preferred mode, a dispersion of reactants, product siloxanes, and saturated aqueous hydrogen chloride is continuously removed from a reactor through a coalescer to a gravitational settling vessel were separation of the dispersion into an upper polyorganosiloxane phase and a lower essentially saturated aqueous hydrogen chloride phase occurs.

The separated, essentially saturated aqueous hydrogen chloride, is recycled to the process. Typically, the essentially saturated aqueous hydrogen chloride is combined with makeup water sufficient to maintain the required excess water to the process. Alternatively makeup water can be provided directly to the process reactor. In a preferred process the essentially saturated aqueous hydrogen chloride and/or make up water is preheated prior to introduction into the reactor to maintain the temperature of the reactor at the desired temperature. Preheating can be achieved by standard means, for example, providing heat to the conduit through which the essentially saturated aqueous hydrogen chloride is recycled to the process.

In the presence of aqueous hydrogen chloride the triorganosilyl group exists as a mixture of triorganochlorosilane and triorganosilanol, the exact ratio of the mixture is controlled by the hydrogen chloride concentration. The triorganosilyl reacts with hydroxy end-substituted polydiorganosiloxanes to end block and prevent further polymer lengthening. In the one-step process described, a portion of the product siloxane polymers may contain end-terminal chloride substitution. The isolated product siloxane component may also contain unreacted triorganosilyl sources. Therefore, to assure product stability, it may be necessary to perform one or more water washes of the product siloxanes to remove residual chloride and allow for completion of the triorganosilyl end blocking process. An effective wash process requires a balancing between the need to ensure the availability of the triorganosilyl in the chloride form and the need to hydrolyze the terminal chlorides from the siloxane polymers. Therefore, a preferred method for the wash process is to perform a first wash with about a stoichiometric equivalence of water, or aqueous dilute acid, in relation to the initial feed of chloride as diorganodichlorosilane to the process. Where, stoichiometric equivalence is as previously described, After separation of the product siloxanes from the aqueous phase, a second wash in about 100% stoichiometric excess of water in relation to the initial feed of chloride as diorganodichlorosilanes to the process is performed. In a preferred process, the water used to wash the siloxanes is recycled to the process as makeup water. Recycling of the water used to wash the siloxanes also allows recovery of chloride present in the water.

To facilitate understanding of the present invention, the following examples are offered. These examples are offered for illustrative purposes only and are not meant to limit the claims of the present invention.

Example 1. Dimethyldichlorosilane was hydrolyzed and the resultant hydrolyzate allowed to condense to form polydimethylsiloxane in a one-step process. The process was conducted in a continuous stirred-type reactor of 500 ml capacity. A mixture consisting of short-chain trimethylsilyl end blocked polydimethylsiloxanes (average dp of about 4), as a source of trimethylsilyl end-blocker, and dimethyldichlorosilane was fed to the reactor at a rate of 5 ml/min (0.04 moles $Me_2SiCl_2$/min). The molar ratio of available trimethylsilyl end blocker to dimethyldichlorosilane in the mixture was 1:90 for run number 1 and 1:230 for run number 2. An aqueous solution comprising 34% to 36% by weight hydrogen chloride was also fed to the reactor at a rate of 44 ml/min. The average resident time of the reactants in the reactor was about 6–7 minutes. Anhydrous hydrogen chloride was allowed to escape through a top vent and was absorbed in a laboratory scrubber. Product siloxanes and saturated aqueous hydrogen chloride overflowed from the reactor, through a sidearm, to a phase separator. The siloxane phase was allowed to separate from the aqueous phase by gravitational settling. The isolated siloxane phase was collected from the phase separator for analysis.

The aqueous phase, saturated with concentrated hydrogen chloride, was combined with makeup water containing 36% by weight hydrogen chloride and recycled to the reactor. The aqueous hydrogen chloride was preheated by passing through a conduit immersed in a heated oil bath prior to returning it to the reactor. During the process the reactor was maintained at a temperature of 45°–50° C. and at a pressure of about 1 atm.

Prior to analysis, a sample of the resultant siloxane fluid was batch washed twice with water to remove residual chloride and complete end blocking of the siloxanes. The first wash was conducted with about a stoichiometric equivalent of water, based on the amount of chloride in the dimethyldichlorosilane feed. The washed siloxanes were separated from the water by means of a phase separator and washed a second time with a 100% stoichiometric excess of water. Again the siloxanes were isolated by means of a phase separator.

The washed siloxanes were analyzed by gas permeation chromotography for viscosity before and after a devolitization step. Devolitization to remove lower boiling siloxanes was conducted at 220° C. and 5 mm Hg vacuum for about 2 hours. The results of two separate runs are presented in Table 1. The viscosity, in centipoise (cps.), for product siloxanes and devolitilized (stripped) siloxanes is presented. Also presented in parentheses is the average degree of polymerization (dp)

TABLE 1

| | Production of Polydimethylsiloxane Polymers in a One-Step Process With Evolution of Anhydrous Hydrogen Chloride | | |
|---|---|---|---|
| Run No. | Viscosity (cps) | Viscosity Stripped (cps) | Yield (%) |
| 1 | 63 (dp 39) | 192 (dp 94) | 68.2 |
| 2 | 34 (dp 36) | 73 (dp 57) | 68.0 |

What is claimed is:

1. An anhydrous hydrogen chloride evolving one-step process for producing siloxanes, the process comprising:
    (A) contacting a mixture comprising a chlorosilane of formula $R_2SiCl_2$, where each R is independently selected from a group consisting of alkyl, alkenyl, aryl, and aralkyl radicals of one to 12 carbon atoms, and a source of triorganosilyl groups of formula $R_3Si-$, where R is as previously described and amount of the triorganosilyl groups is effective to control degree of polymerization of siloxanes within a range of 10 to about 700, with a stoichiometric excess of water in relation to chloride present on the chlorosilane, the water being essentially saturated with hydrogen chloride; at a temperature of about 24° C. to 100° C. and a pressure of one to ten atmospheres;
    (B) isolating siloxanes of formula $R^1R_2SiO(R_2SiO)_aSiR_2R^1$, where a is a value from 10 to 700. R is as previously described, and each $R^1$ is independently selected from a group consisting of R and chloride; anhydrous hydrogen chloride: and essentially saturated aqueous hydrogen chloride; and
    (C) recycling the essentially saturated aqueous hydrogen chloride to Step (A).

2. A process according to claim 1, where the isolated siloxanes are washed by contacted with a stoichiometric excess of water, in relation to residual chloride, to remove residual chloride and effect triorganosilyl end blocking of isolated siloxanes containing end-terminal chloride.

3. A process according to claim 1, where the chlorosilane is dimethyldichlorosilane and the triorganosilyl group is trimethylsilyl.

4. A process according to claim 1, where the amount of triorganosilyl groups is a molar ratio of diorganodichlorosilane to triorganosilyl groups in a range of about five to about 350.

5. A process according to claim 1, where the amount of triorganosilyl groups is a molar ratio of diorganodichlorosilane to triorganosilyl groups in a range of about 15 to about 100.

6. A process according to claim 1, where the stoichiometric excess of water to chloride is a molar ratio of greater than 0.5 to about 200.

7. A process according to claim 1, where the stoichiometric excess of water to chloride is a molar ratio of about 10 to 50.

8. A process according to claim 1, where the water essentially saturated with hydrogen chloride contains about 36 to 38 weight percent hydrogen chloride, 9. A process according to claim 1, where the temperature is within a range of about 45° C. to 50° C.

10. A process according to claim 1, where the pressure is about one atmosphere.

11. A process according to claim 1, where a is an integer from about 30 to 200.

12. A process according to claim 1, where the siloxanes are trimethylsilyl end blocked polydimethylsiloxane polymers.

13. A process according to claim 2, where the chlorosilane is dimethyldichlorosilane and the triorganosilyl group is trimethylsilyl.

14. A process according to claim 2, where the amount of triorganosilyl groups is a molar ratio of diorganodichlorosilane to triorganosilyl groups in a range of about five to about 350.

15. A process according to claim 2 where the amount of triorganosilyl groups is a molar ratio of diorganodichlorosilane to triorganosilyl groups in a range of about 15 to about 100.

16. A process according to claim 2, where the stoichiometric excess of water to chloride is a molar ratio of greater than 0.5 to about 200.

17. A process according to claim 2, where the stoichiometric excess of water is a molar ratio of about 10 to 50.

18. A process according to claim 2, where the water essentially saturated with hydrogen chloride contains about 36 to 38 weight percent hydrogen chloride.

19. A process according to claim 2, where the temperature is within a range of about 45° C. to 50° C.

20. A process according to claim 2, where a is an integer from about 30 to 200.

21. A process according to claim 1, where the triorganosilyl groups source is short-chained trimethylsilyl end blocked polydimethylsiloxanes.

22. A process according to claim 2, where the triorganosilyl groups source is short-chained trimethylsilyl end blocked polydimethylsiloxanes.

23. A process according to claim 1, where the stoichiometric excess of water is a molar ratio of water to chloride of five to about 100.

24. A process according to claim 2, where the stoichiometric excess of water is a molar ration of water to chloride of five to about 100.

25. A process according to claim 2, where excess water resulting from the wash and containing residual chloride is recycled to the process as makeup water.

* * * * *